May 29, 1934. N. OTTINGER Re. 19,189

HAND BAG AND SIMILAR RECEPTACLE

Original Filed Oct. 28, 1931

INVENTOR
Nathan Ottinger
BY
C. P. Goepel
his ATTORNEY

Reissued May 29, 1934

Re. 19,189

UNITED STATES PATENT OFFICE 19,189

HAND BAG AND SIMILAR RECEPTACLE

Nathan Ottinger, New York, N. Y.

Original No. 1,907,657, dated May 9, 1933, Serial No. 571,609, October 28, 1931. Application for reissue December 20, 1933, Serial No. 703,321

6 Claims. (Cl. 150—42)

This invention relates to hand bags and similar receptacles, being also applicable to other articles of flexible material, and, in the illustrated embodiment thereof, has for its general object and purpose to provide a hand bag having simple, effective and easily operated means for securely closing the same, and whereby the use of metal knobs, clasps and similar latching devices may be dispensed with.

It is a more particular object of the invention to provide one of two opposing parts or walls of the article, upon the outer side thereof, with a flexible element unattached to said part along one of its edges to form an open pocket, and a flap insertable into said pocket, and connecting means between said flap and the other of said parts permitting displacement of the flap from a normal position for insertion into said pocket, whereby said connection is held in closely superimposed position upon said element to substantially wholly conceal the same.

It is another object of my invention to provide a closure means for hand bags as above characterized which may be easily operated to open or close the bag, and which will enable such hand bags to be produced in a great variety of ornamental and attractive forms.

With the above and other objects in view, the invention consists in the improved hand bag or other article of flexible material, and in the form, construction and relative arrangement of the several parts, as will be hereinafter more particularly described, illustrated in the accompanying drawing, and subsequently incorporated in the subjoined claims.

In the drawing wherein I have illustrated one simple and practical embodiment of the invention, and in which similar reference characters designate similar parts throughout the several views,—

Figure 1:
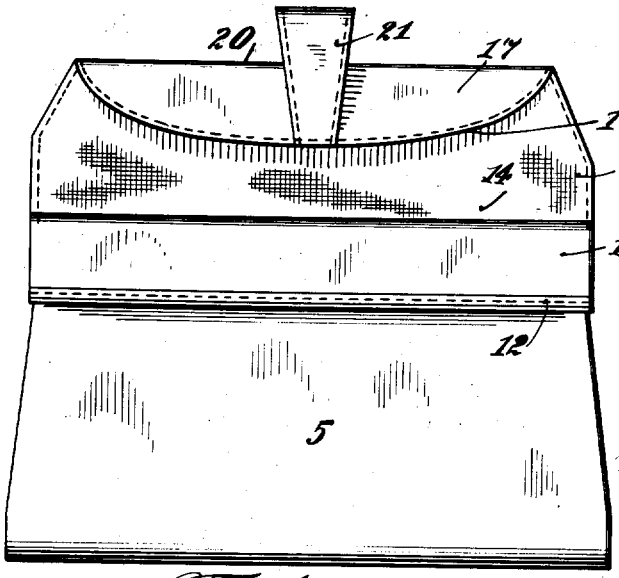
Figure 1 is a front elevation of a hand bag provided with one embodiment of my invention, showing the bag open.

Referring in detail to the drawing, the body of the hand bag having the front and rear or back walls 5 and 6 respectively, is constructed in the usual manner of leather or other ornamental flexible material suitably reinforced and provided with the internal lining sheet 7 of silk or fabric. The opposite ends of the bag between these side walls are closed by the bellows fold of leather indicated at 8. To the outer side of the back wall 6 of the bag a horizontally disposed hand strap or loop 9 is suitably attached at its opposite ends.

The front wall 5 of the body of the bag which comprises two relatively thin sheets of leather, has its upper end portion turned outwardly and downwardly as at 10, and secured at opposite ends thereof to the side edges of said body wall to form a downwardly opening pocket 11 extending across substantially the entire width of the bag. The two leather sheets of the front wall are stitched together at their longitudinal edges to provide an ornamental seam indicated at 12.

The back wall 6 of the hand bag embodies a reinforcing sheet of cardboard or other suitable material shown at 13, which terminates at its upper end at the upper edges of the end walls 8, the leather and the lining sheet of this back wall being extended beyond said reinforcing sheet 13 to provide the part 14 adapted to fold over the open top of the bag. In spaced relation to the reinforcement 13, said extension is provided with a relatively narrow reinforcement sheet 15 which is adapted to overlie the pocket-forming extension 10 of the front wall of the bag. The section of the rear wall extension which is provided with the reinforcement 15, is preferably tapered or inclined inwardly at its opposite ends as at 16. Beyond this part of the rear wall extension, the latter terminates in the closure flap 17, which preferably is provided with a curved or rounded edge 18, and also with the reinforcing sheet 19, which is spaced from the reinforcement 15 to thereby provide the freely flexing unreinforced part 20. The sheet 19 acts to stiffen the flap 17 so that it is a more or less rigid unit with respect to the relatively yieldable part 20.

To the outer side of the closure flap 17 at the approximate center thereof, a suitable tab or finger piece 21, of leather or other suitable material, may be securely attached to project beyond the fold 20.

In the use of a hand bag as above described, to close the open top thereof, the back wall extension is folded forwardly and downwardly over the open top of the bag until the curved edge 18 of flap 17 bears against the outer surface of the front wall 5, below the pocket 11. By then applying an inward pressure against said flap, said curved edge 18 thereof rides freely on the surface of the wall 5, as the closure flap 17 folds upwardly into the pocket 11, as shown in Fig.

Figure 2:
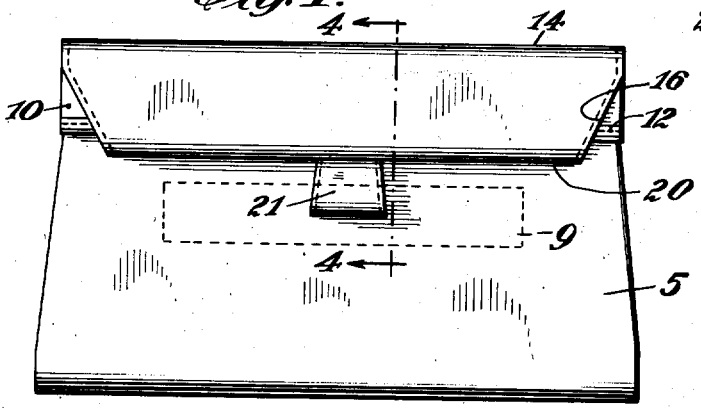
Fig. 2 is a similar view showing the hand bag closed.
Figure 4:
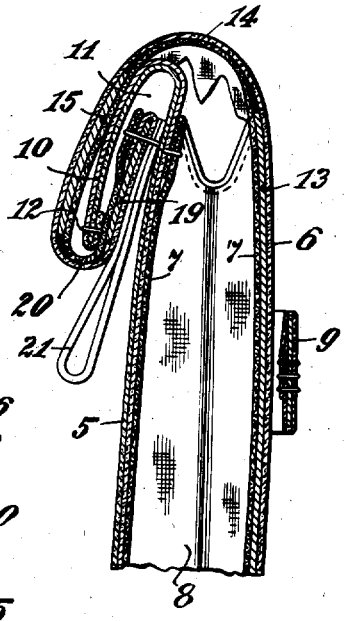
Fig. 4 is an enlarged fragmentary sectional view taken on the line 4—4 of Fig. 2.
Figure 3:
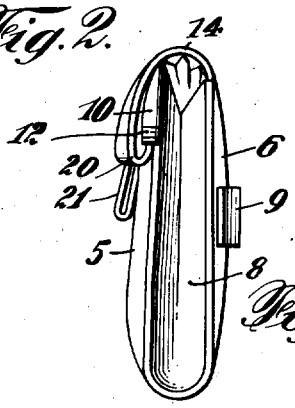
Fig. 3 is an end elevation.

4 of the drawing. Thus, as indicated in Fig. 2, the part of the back wall extension of the bag having the reinforcement 15, is securely held in closely folded relation upon the part 10 of the front wall 5, which forms the outer side of the pocket 11. In this manner the closure extension of the rear wall of the bag is securely retained in its folded closed position, so that the accidental opening of the bag and loss of its contents are prevented. This result is obtained without the use of metal parts in the bag construction, such as knobs or cooperating clasp elements on the upper edges of the bag walls. Also, it will be apparent that such a bag closing means readily lends itself to the production of hand bags of this type in a great variety of novel and ornamental forms.

It will be understood from the foregoing, that the connecting means between the flap 17 and the end portion 14 of the wall 6 permits said flap to be yieldingly flexed with respect to said end portion for insertion beneath the free edge of the flexible element or part 10. Thus, also it will be evident, that when said flap is disposed within the pocket 11, it operates to hold said portion in closely superimposed, overlapping relation upon the part or element 10, and substantially wholly conceal the latter. This materially contributes to the neat and attractive appearance of the article.

Figure 5:
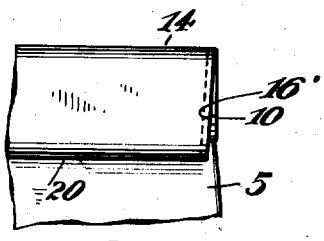
Fig. 5 is a fragmentary elevation showing a slightly modified form of the device.

In Fig. 5 of the drawing, I have shown the part of the closure extension of the rear wall having the reinforcement 15 of a somewhat different form, so that its end edges 16′ extend nearly in parallel relation to the end edges of the wall 10 of the pocket 11. The flap 17 is of course of corresponding greater width and therefore, when disposed in the pocket 11, extends along substantially the entire lower open edge thereof.

I have herein described and illustrated a preferred and practical embodiment of my present improvements, although it is to be understood that in the further practical development of the invention, the essential features thereof may be suitably embodied in various other alternative structural forms. Accordingly the privilege is reserved of resorting to all legitimate changes therein as may be fairly embodied within the spirit and scope of the invention as claimed.

I claim:

1. A hand bag comprising a body having front and back walls of flexible material, said front wall at the top of the bag having an outwardly and downwardly folded part secured at its ends to said wall, and providing a downwardly opening pocket on the outer side thereof, said back wall of the bag having an extension at its upper end foldable over the open top of the bag, and part of said extension being reinforced and relatively rigid to overlie the downwardly folded upper end part of the front wall of the bag, and said extension in spaced relation to said reinforced part thereof terminating in a reinforced relatively rigid closure flap, foldable upwardly against the front wall of the bag into said pocket to retain said back wall extension of the bag in its closed position.

2. A hand bag comprising a body having front and back walls of flexible material, said front wall at the top of the bag having an outwardly and downwardly folded part secured at its ends to said wall, and providing a downwardly opening pocket on the outer side thereof, said back wall of the bag having an extension at its upper end foldable over the open top of the bag, and part of said extension being reinforced and relatively rigid to overlie the downwardly folded upper end part of the front wall of the bag, and said extension in spaced relation to said reinforced part thereof terminating in a reinforced relatively rigid closure flap, foldable upwardly against the front wall of the bag into said pocket to retain said back wall extension of the bag in its closed position, and a relatively rigid finger tab fixed to said closure flap, and having a free end portion projecting beyond the flexible connection between said flap and the first named reinforced part of said back wall extension of the bag, and whereby said flap may be manipulated and positioned within or removed from said pocket.

3. An article of the character described comprising a body of flexible material forming a pocket open at its top and having front and back walls, a flexible part extending horizontally across the outer side of said front wall at the upper end thereof and connected with said wall at its opposite ends and upper edge, the lower edge of said part being free to provide a downwardly opening pocket on said front wall having a closed upper end, said back wall having a closure extension at its upper end foldable over said open top of the article and provided with a relatively foldable flap at its free end, a finger tab secured to the outer face of said flap and extending transversely across the central portion thereof to stiffen and reinforce the same, whereby said flap may be manipulated and folded upwardly beneath the free edge of said flexible part and closely confined thereby against said front wall to retain said extension of the back wall in its closed position.

4. In combination with an article of flexible material having opposing parts; a flexible element extending across the outer face of one of said parts, permanently connected therewith along one of its edges and having an opposite free edge, to form in conjunction with said part, a pocket open along one side thereof, the other of said parts having an extension adapted to be overlapped upon said element and provided with a longitudinally extending fold therein forming an end flap manipulable relative to said extension by flexing of said fold and insertable into said pocket to cooperate with the pocket walls and releasably hold said overlapping portion of the extension in closely superimposed relation upon said flexible element.

5. In combination with an article of flexible material having opposing parts; a flexible element extending across the outer face of one of said parts and connected therewith to form a pocket open along one edge thereof, the other of said parts having an extension adapted to be overlapped upon said element, a flap and means flexibly connecting the flap with said extension, and reinforcing means for said flap rendering the same comparatively rigid for manipulation relative to said extension, said reinforcing means including a finger tab disposed transversely of the flap and secured thereto for facilitating the insertion of the flap into said pocket to thereby releasably confine the overlapping portion of the extension in closely superimposed relation to said pocket.

6. In combination with an article of flexible material having opposing parts; a flexible element extending across the outer face of one of said parts and connected therewith to form a pocket open along one edge thereof, the other of said parts having an extension adapted to be overlapped upon said element, a flap and means flexibly connecting the flap with said extension, and a reinforcing element, substantially co-extensive in area with said flap, secured to one side thereof, to render the same comparatively rigid for manipulation relative to said extension and insertion into said pocket, to thereby releasably confine the overlapping portion of the extension in closely superimposed relation to said pocket.

NATHAN OTTINGER.